L. BROWN.
CONSTRUCTION FOR MOTION PICTURE CAMERAS OR THE LIKE.
APPLICATION FILED JAN. 20, 1920.
1,428,321.
Patented Sept. 5, 1922.
2 SHEETS—SHEET 1.
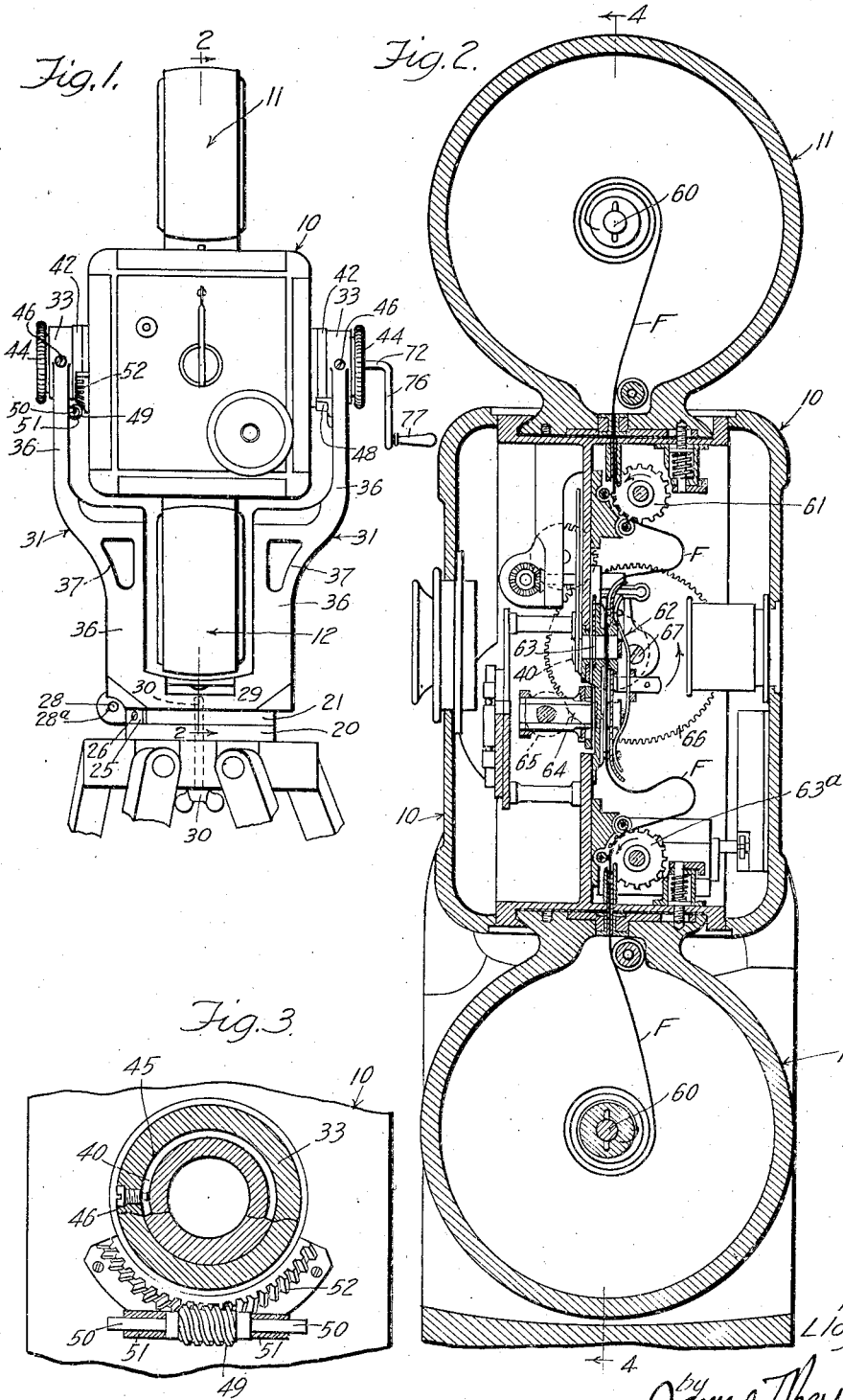
Inventor:
Lloyd Brown.
by James T. Berkeley
his Attorney,

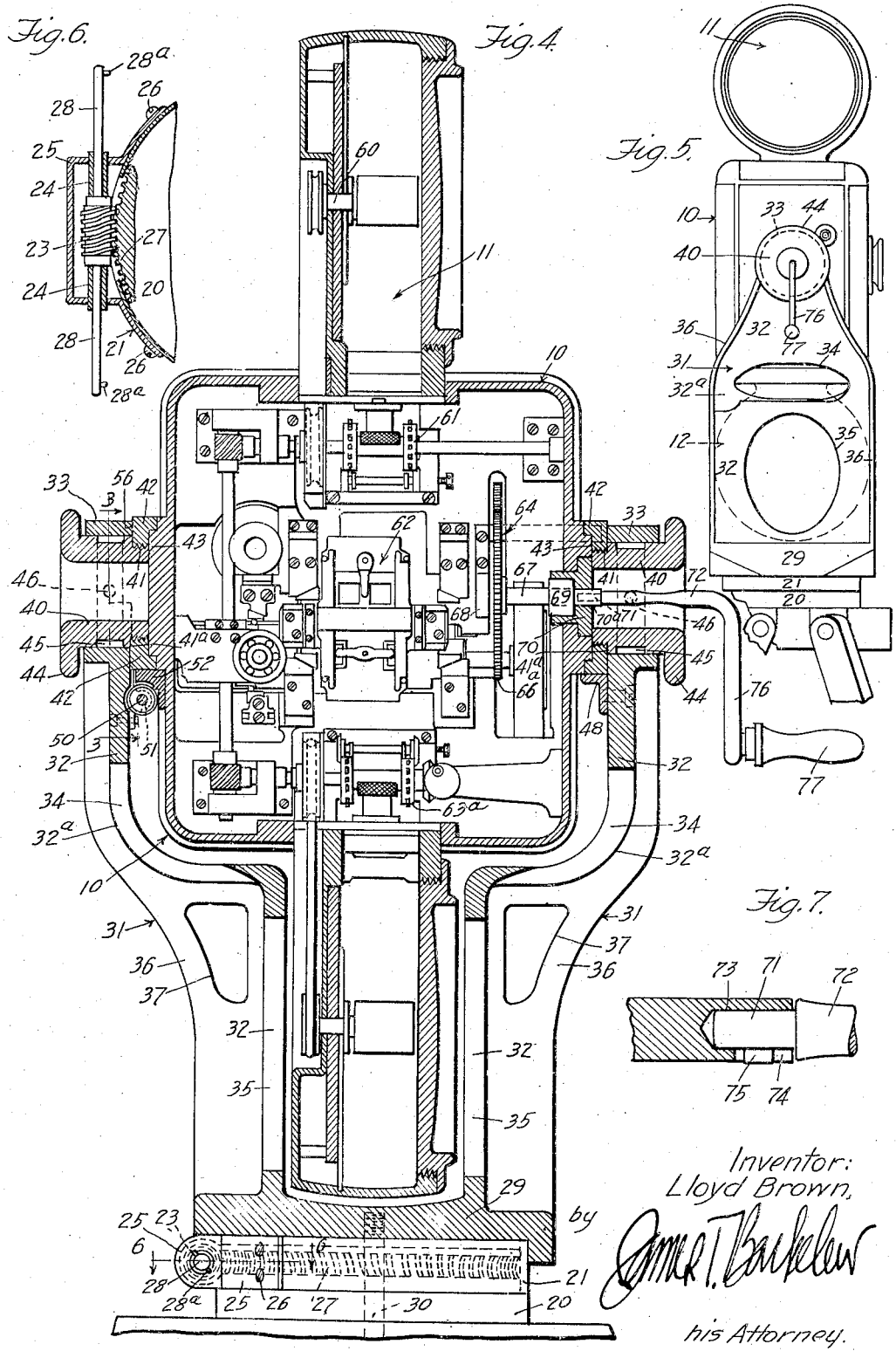

Patented Sept. 5, 1922.

1,428,321

UNITED STATES PATENT OFFICE.

LLOYD BROWN, OF LOS ANGELES, CALIFORNIA, ASSIGNOR TO SILENT DRAMA SYNDICATE, A TRUSTEESHIP, LLOYD BROWN AND ALEXANDER GRAYDON, TRUSTEES.

CONSTRUCTION FOR MOTION-PICTURE CAMERAS OR THE LIKE.

Application filed January 20, 1920. Serial No. 352,764.

*To all whom it may concern:*

Be it known that I, LLOYD BROWN, a citizen of the United States, residing at Los Angeles, in the county of Los Angeles, State of California, have invented new and useful Improvements in Construction for Motion-Picture Cameras or the like, of which the following is a specification.

This invention relates to such mechanisms as motion picture cameras and similar devices; and it is a general object of the invention to provide a construction, arrangement and mounting for a motion picture camera which will give great strength and solidarity, freedom from vibration, ease of adjustment and manipulation. There are other objects, and corresponding features of the invention, as will be best apparent from the following description of a preferred form of my invention.

Heretofore motion picture cameras have ordinarily been mounted at their lower ends upon a mounting head revoluble upon a suitable support, as a tripod, and also capable of being tilted. Tilting motion of the camera box, and of the magazine boxes with the camera box, has taken place around a horizontal axis at the lower end of the camera. The whole support for the camera has been at the lower end of the camera case. Any tilting of the camera case thus necessarily throws the camera case forward and back and thus increases the tendency of the whole arrangement to tip over and decrease its solidity and stability. Such tilting also changes the position of the exposure area of the film. Furthermore, any vibration set up in the camera mechanism is allowed free play, and sometimes is greatly augmented, due to the fact that the support of the camera case is at its lower end.

In my arrangement and construction these difficulties are overcome, and corresponding advantages are attained, together with other advantages, which will be explained hereinafter. A primary feature of a mechanism embodying my invention is the mounting of the camera case on a horizontal axis which passes through the case preferably at or near its center; so that the camera case is directly supported on a substantially central horizontal axis in contradistinction to being supported upon a horizontal adjustment axis at its lower end far removed from its center of mass and far removed from the operating mechanism.

I provide a supporting frame which, although it may be made of metal of low specific gravity, (for instance, of aluminum) has sufficient mass and strength and solidity to form a very stable support. This relatively rigid frame performs a function of solidly connecting the camera case, by a mounting at or near its center as stated, to the ultimate support, for instance, the tripod. The result is that the camera itself is very rigidly supported and vibration is thus reduced to a minimum in any type of camera.

For the purpose of making clearly intelligible the general and broad features of my invention, as well as the specific details of a preferred form of mechanism embodying the invention, I now proceed to a detailed description of that preferred form of mechanism, and for that purpose refer to the accompanying drawings in which—

Fig. 1 is a rear elevation of my improved camera construction and mounting; Fig. 2 is an enlarged vertical central section taken as indicated by line 2—2 on Fig. 1; Fig. 3 is a detail section taken as indicated by line 3—3 on Fig. 4; Fig. 4 is a vertical central section taken as indicated by line 4—4 on Fig. 2; Fig. 5 is a side elevation of the mechanism; Fig. 6 is a detail section taken as indicated by line 6—6 on Fig. 4; and Fig. 7 is a detail section showing the connection of the operating crank to the main driving shaft of the mechanism.

In the drawings the numeral 10 designates a camera case which may be made of any suitable size, configuration and design, and may contain any suitable camera mechanism. The particular details of the camera mechanism are immaterial so far as any broad aspects of my invention are concerned. In these drawings I have, as a matter of fact, shown the camera mechanism which I have described and claimed in my co-pending application Serial No. 338,743, filed November 17, 1919, and entitled "Kinetograph mechanism," but it will be readily understood that the present invention is not at all limited to kinetograph mechanisms of that particular character. There are, however, some features of arrangement that I have herein shown which do enter into the present invention somewhat in detail; but it will be readily seen that, even as regards these details, the present invention is not necessarily limited to the particular type of camera mechanism shown in the drawings.

Neither is the present invention limited at all to the particular type of film magazines 11 and 12 shown in the drawings. These film magazines 11 and 12 are the subject matter of another co-pending application filed on the 20th day of January, 1920, Serial No. 352,765, and entitled "Magazine and magazine attachment for kinetograph." It will not be necessary here to explain these film magazines in detail.

The head of the supporting tripod is illustrated at 20. This tripod head is provided with the usual swivel head 21. Swivel head 21 may be swiveled around on the tripod head 20 by means of the usual worm screw arrangement. A worm wheel 23 is mounted in bearings 24 in a case 25 secured at 26 to the swivel head 21; and the stationary head 20 has a worm gear 27 extending around its periphery and engaged by the worm wheel 23. The shaft 28 of worm wheel 23 extends out in both directions and is provided with pins 28[a] which act as keys for the crank handle.

The base 29 of the camera supporting frame is mounted upon swivel head 21 in any ordinary and usual manner, as by means of the screw 30.

The camera supporting frame or "cradle" comprises a structure substantially U-shaped, having two oppositely disposed arms 31 rising from the base 29. Each of these arms preferably comprises a web 32 which extends upwardly from the base and then, at 32[a], extends outwardly, and then extends on upwardly to the bearings 33. This configuration fits closely to the camera box and the lower magazine 12. Each web is lightened by openings 34 and 35 and is strengthened by flanges 36 at its edges, the flanges being somewhat lightened by openings 37 as shown. The width of each arm 31 in its lower part is about the same as the diameter of base 29, the upper parts of the arms tapering upwardly to the bearings 33, as seen in side elevation in Fig. 5. The arms are exceptionally sturdy and rigid in construction although they may be of comparatively light weight, the whole supporting frame being preferably of cast aluminum.

The camera case is provided with hollow trunions 40 carried in the bearings 33. These trunnions at their inner ends are screw-threaded at 41 into carrying rings 42 which are mounted upon bosses 43 of the camera case. These carrying rings may be fitted tightly upon the bosses 43 so that the rings will turn with the camera case and so that all relative turning motion will occur between the trunnions 40 and the bearings 33. The camera case 10 with its carrying rings 42 fit snugly laterally between the two bearings 33; so that no side play is allowed. The trunnions, screwing into rings 42, shoulder up against the rings at 41[a] before their outer enlarged ends shoulder against the outer ends of the bearings; so that no strain is put on the cradle when the trunnions are screwed tightly into place. When it is desired to remove the camera case from the carrying frame, the trunnions 40 may be unscrewed from carrying rings 42. The trunnions are provided at their outer ends with knurled flanges 44. When the trunnions are unscrewed they are then free of the carrying rings, and the camera may be lifted from the carrying frame. To prevent the trunnions from dropping out of the bearings 33 each trunnion is provided with a peripheral groove 45 and a screw 46 set in bearing 33 projects into the peripheral groove and forms a limiting stop to limit the outward movement of the trunnion. To prevent the dropping of the camera case when the trunnions are thus removed, at one side of the supporting frame there is an angle bracket as shown at 48, beneath the boss 43 and the carrying rings 42. At the other side of the camera the worm wheel 49 performs this same office and at the same time performs the office of tilting the camera about the horizontal axis of trunnions 40. This worm 49 is mounted on a shaft 50 supported in bearings 51 which are mounted upon web 32 of the supporting frame. The worm 49 meshes with a worm sector 52 which is secured to the camera case itself. It will be noted that the bearings surfaces of trunnions 40 are of comparatively large diameter, so large that the trunnions are hollowed out for the purpose of saving weight and also for another purpose as hereinafter described. The end bearing surfaces at 56 between rings 42 and the inner surfaces of bearings 33 are also comparatively large; and as a consequence very little or no wear at all takes place in the supporting bearing, and the camera is always held rigidly in proper position.

Each of the film magazines 11 and 12 is mounted on the case in a suitable manner, explained in detail in my said co-pending application; and each magazine has a shaft 60 for carrying a reel. The film F passes down from the upper magazine over the feed sprockets 61 and thence down through the camera mechanism proper, and through or behind the film gate 62, passing the exposure aperture 63 while held by the film gate. Thence the film passes over the lower feed sprockets 63[a], and down into the lower magazine 12. The film gate 62 forms a part of a film carrier. The means for intermittently moving the film is illustrated in Fig. 2 at 64, and this means is driven through the medium of gears 65 and 66 from the main driving shaft 67 of the whole mechanism. The main driving shaft 67 is located substantially centrally of the mechanism as viewed in Fig. 2. All this mechanism is explained in detail in my said first mentioned co-pending application. The driving shaft 67 is supported in bearings 68 and 69, the bearings 69 being supported in a bushing 70 set in one of the bosses 43. The shaft 67 projects outwardly into the hollow of one of the trunnions 40, as illustrated at 70ª, and the end 71 of crank shaft 72 is adapted to be inserted in a socket 73 in the end of shaft 67. This socket has a slot 74 in its wall into which a key 75 enters, so as to key the crank shaft 72 to the main driving shaft 67. Crank shaft 72 carries a crank 76 and crank handle 77.

Although the main driving shaft 67 and the crank are not exactly centered on the horizontal axis of the trunnion 40, yet they are closely enough centered about that horizontal axis, that the crank remains substantially stationary in its general location. Furthermore, the crank is connected to the case (through the bearings of the main shaft) at a point substantially central with the axis of support of the case; and the case being supported upon rigid and strong members, there is thus eliminated any tendency of the case to be displaced or vibrated due to the pressure of the hand on the crank handle. Furthermore, it will be noted that the exposure aperture 63 is very near the horizontal axis of the whole mechanism and that, in fact, the exposure area on the film itself behind the aperture 63 is practically exactly centered upon the horizontal axis of trunnion 40. Consequently, any movement of the camera case which might possibly take place about its horizontal axis will not change the position of the exposure area of the film.

The features of the support herein shown and described are not claimed herein, such support being made the subject of a divisional application in accordance with official requirement, and embodied in my co-pending application Serial No. 579,189 filed August 2, 1922.

The broad and underlying features of the invention itself will be understood from the foregoing description; it being readily seen that the invention is not limited to the particular details of mechanism herein set forth, nor to combinations with the particular kind of camera mechanism herein illustrated. I have only given this specific and detailed description for the purpose of making my invention most readily intelligible and not for the purpose of limiting the invention to those particular things herein set forth.

Having described a preferred form of my invention, I claim:

1. In motion picture apparatus, a case containing kinetograph mechanism, an exposure aperture in said case, and means supporting said case on a substantially horizontal axis passing through the case and substantially in line with the exposure aperture.

2. In motion picture apparatus, a case containing kinetograph mechanism, an exposure aperture in said case, and means supporting said case adjustably about a horizontal axis passing through said case and substantially in line with said exposure aperture.

3. In motion picture apparatus, a case containing kinetograph mechanism, an exposure aperture in said case, and a plurality of pivotal members supporting said case on a horizontal axis passing therethrough on a line substantially on center with the exposure aperture in said case.

4. In motion picture apparatus, a case containing kinetograph mechanism, an exposure aperture in said case, a substantially U-shaped supporting cradle for said case having upwardly extending arms embracing the case, and pivotal bearings for the case in said arms to support it on a horizontal axis passing therethrough on a line substantially on center with said exposure aperture.

5. In motion picture apparatus, a case containing kinetograph mechanism, an exposure aperture in said case, film magazines mounted on and movable with said case, means supporting said case and magazines adjustably about a horizontal axis passing substantially centrally through said case and substantially in line with said exposure aperture.

6. In motion picture apparatus, a supporting cradle mounted to be adjustable about a vertical axis and embodying a pair of upwardly extending arms, a kinetograph case between the arms, an exposure aperture in said case, trunnions substantially central of the case and substantially in line transversely of said exposure aperture, and the arms having bearings supporting the trunnions on a horizontal axis.

7. In motion picture apparatus, a supporting cradle mounted to be adjustable about a vertical axis and embodying a pair of upwardly extending arms, a kinetograph case between the arms, exposure aperture in said case, hollow trunnions for the case extending from it on opposite sides and on a horizontal axis substantially central of the case, substantially in line transversely with said exposure aperture, the arms having bearings at their upper ends for the trunnions; kinetograph mechanism in the case, and driving means therefor embodying a shaft extending through a hollow trunnion.

8. The combination of a kinetograph case having an exposure aperture therein, film magazines attached to said case on opposite sides thereof and in balanced relation, film operating mechanism in said case, a substantially U-shaped cradle, and oppositely disposed pivotal members supporting said case and its associated parts on a horizontal axis substantially central of said case and substantially in line with the exposure aperture.

9. The combination of a kinetograph case having an exposure aperture therein, film magazines attached to said case on opposite sides thereof and in balanced relation, film operating mechanism in said case, a substantially U-shaped cradle, oppositely disposed pivotal members supporting said case and its associated parts on a horizontal axis substantially central of said case and substantially in line with the exposure aperture, and means for actuating said film operating mechanism manipulatable exteriorly of said case, disposed substantially in line with the axis of said pivot members.

In witness that I claim the foregoing I have hereunto subscribed my name this 31st day of December 1919.

LLOYD BROWN.

Witness:
VIRGINIA BERINGER.